United States Patent [19]

Kimura

[11] Patent Number: 4,835,688
[45] Date of Patent: May 30, 1989

[54] THREE-DIMENSIONAL IMAGE PROCESSING APPARATUS

[75] Inventor: Tokunori Kimura, Utsunomiya, Japan

[73] Assignee: Kabushiki Kaisha Toshiba, Kawasaki, Japan

[21] Appl. No.: 147,495

[22] Filed: Jan. 26, 1988

[30] Foreign Application Priority Data

Jan. 28, 1987 [JP] Japan .................. 62-16024

[51] Int. Cl.$^4$ ............................................. G06F 15/42
[52] U.S. Cl. ............................. 364/413.22; 378/901; 364/413.13
[58] Field of Search ............. 364/413.13, 413.22; 378/901; 382/6, 27; 367/72

[56] References Cited

U.S. PATENT DOCUMENTS

| | | | |
|---|---|---|---|
| 4,131,021 | 12/1928 | Mezrich | 73/606 |
| 4,630,203 | 12/1986 | Szirtes | 364/413.13 |
| 4,631,750 | 12/1986 | Gabriel | 382/41 |
| 4,751,643 | 6/1988 | Lorensen | 364/413.13 |

Primary Examiner—Charles E. Atkinson
Assistant Examiner—Kimthanh Tbui
Attorney, Agent, or Firm—Finnegan, Henderson, Farabow, Garrett, & Dunner

[57] ABSTRACT

A three-dimensional image processing apparatus includes a first three-dimensional memory for storing first voxel data representing a three-dimensional CT image, a level detector for comparing the first voxel data with CT values of an epidermis, a bone, and a blood vessel, second three-dimensional memories for storing second voxel data (binary) of the epidermis, the bone, and the blood vessel obtained by the level detector, a distance detector for detecting distances between a predetermined projection plane in a three-dimensional space and the second voxel data, a minimum detector for detecting a distance between the projection plane and one of the second voxel data of the epidermis, bone, and blood vessel, which is closest to the projection plane, and a surface image generating circuit for shading minimum values of pixels in the projection plane to generate a surface image. The projection plane in the three-dimensional space is partially moved into a memory space in the second voxel data, thereby simulating a surface image obtained when a three-dimensional CT image is cut.

8 Claims, 7 Drawing Sheets

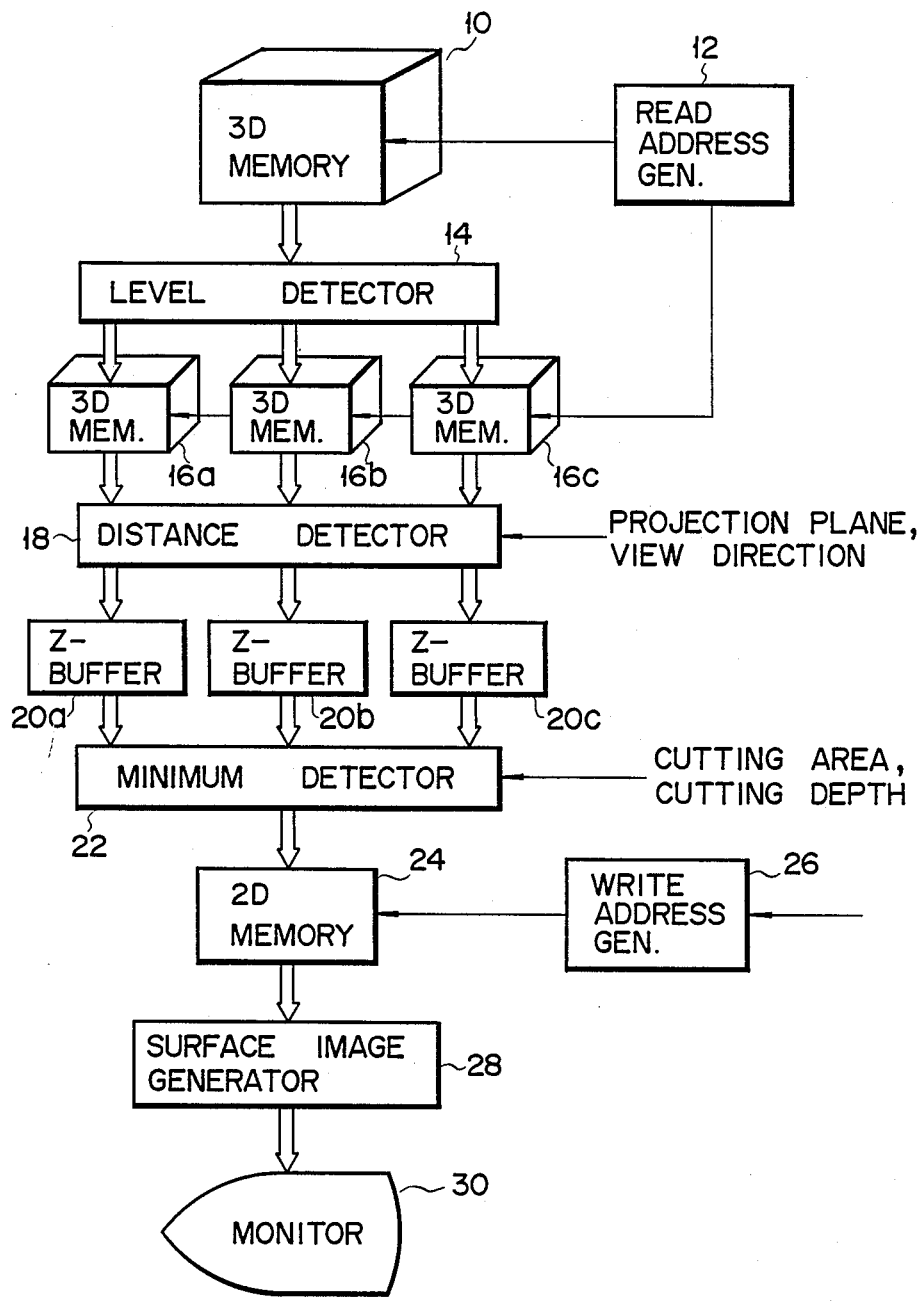
F I G. 1

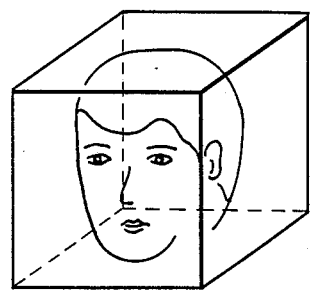
F I G. 2
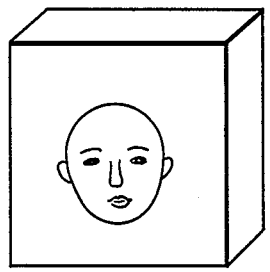 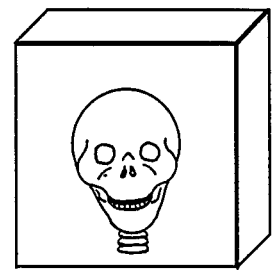 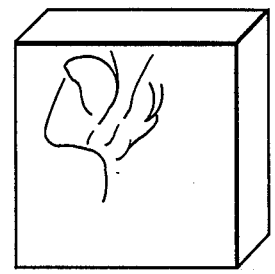
F I G. 3A   F I G. 3B   F I G. 3C
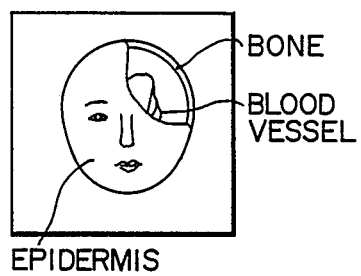 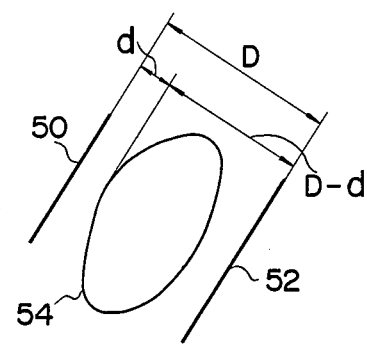
F I G. 4   F I G. 5

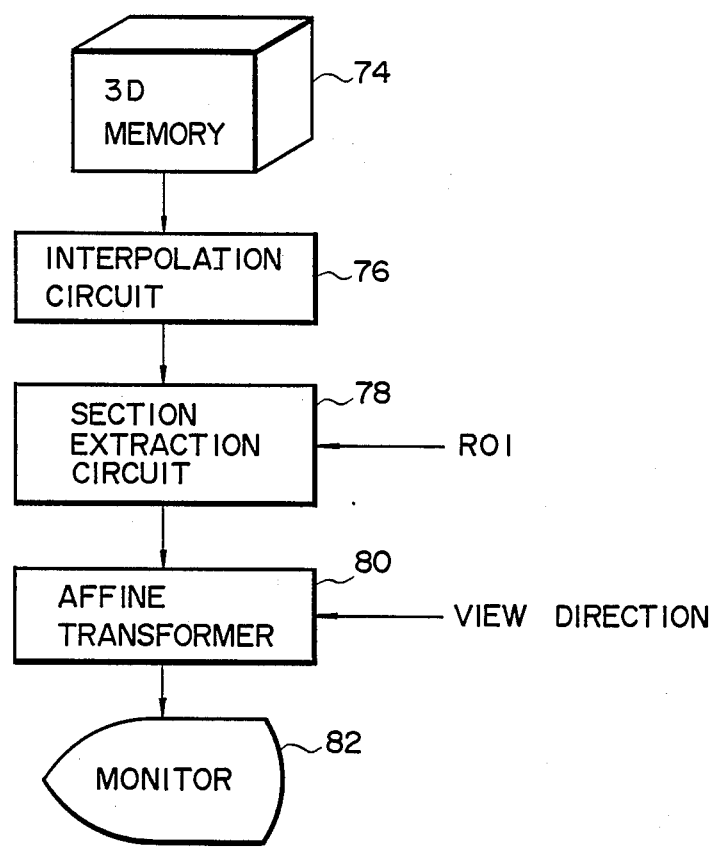
F I G. 7

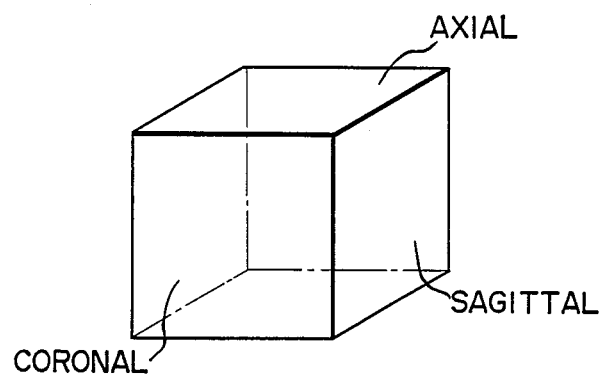
F I G. 8A
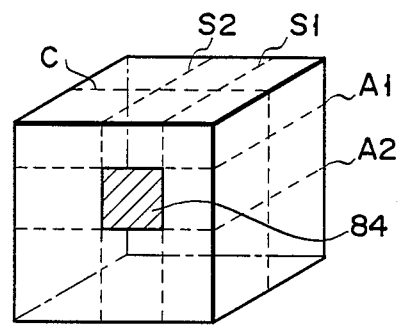
F I G. 8B
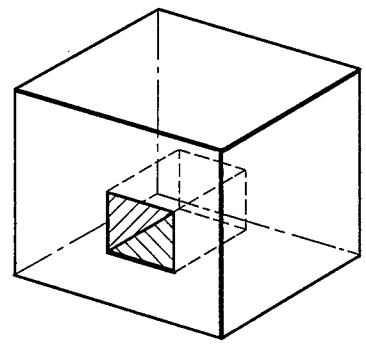
F I G. 8C

AXIAL

CORONAL           SAGITTAL

THREE-DIMENSIONAL IMAGE PROCESSING APPARATUS

BACKGROUND OF THE INVENTION

The present invention relates to a three-dimensional image processing apparatus and, more particularly, to a three-dimensional image processing apparatus for displaying soft tissues (also called as parenchyma) of a human body such as an epidermis and a blood vessel.

Recently, three-dimensional image processing techniques using a CT (computed tomography) image and an MR (magnetic resonance) image have been widely developed.

In practice, three-dimensional image processing for bones (hard parts) has been realized in a clinical case. This is because an image of bones can be easily extracted. Bones appear on an X-ray CT image as a portion having a high CT value. Therefore, if a portion having a CT value larger than a predetermined threshold value is defined as a bone, binary display distinguishing between bones and other portions can be performed.

An example of a display method of soft tissues is a method of reconstructing a given section using a plurality of parallel CT images (sagittal, coronal, and oblique images). However, since each image is a section, positional relationship between the images cannot be easily recognized. As a result, it is difficult to allow three-dimensional recognition of the object.

In addition, a demand has recently arisen for three-dimensional simulation in planning an operation. Therefore, a surface image of a given portion of three-dimensional object must be displayed. However, since soft tissues cannot be easily three-dimensionally displayed, it is impossible to simulate an operation.

SUMMARY OF THE INVENTION

It is, therefore, an object of the present invention to provide a three-dimensional image processing apparatus which can three-dimensionally display an object without damaging its original information and hence can support simulation in planning an operation.

According to the three-dimensional image processing apparatus of the present invention, a plurality of second voxel data which represent three-dimensional objects of tissues is extracted from first voxel data which represents a three-dimensional object, a distance between a predetermined projection plane and each second voxel data in a three-dimensional space is obtained, and a surface image is formed in accordance with a distance of the second voxel data which is closest to the projection plane. Then, the projection plane is moved in the three-dimensional space close to a memory space of the second voxel data, thereby simulating a surface image obtained when the three-dimensional image is cut.

In addition, according to the three-dimensional image processing apparatus of the present invention, axial, sagittal, and coronal sectinal data are extracted from voxel data which represents a three-dimensional object. These sectional data are affine-transformed and combined on the basis of a view direction to form a volume multi-plane reconstruction (MPR) image. This volume MPR image is simply displayed or displayed in a multi-frame manner together with the axial, sagittal, and coronal sectional images.

Moreover, according to the three-dimensional image processing apparatus of the present invention, the above surface and volume MPR images are combined and displayed in a multi-frame manner.

BRIEF DESCRIPTION OF THE DRAWINGS

FIG. 1 is a block diagram of a first embodiment of a three-dimensional image processing apparatus according to the present invention;

FIG. 2 is a perspective view of voxel data which represents a three-dimensional object;

FIGS. 3A, 3B, and 3C are perspective views of voxel data of an epidermis, a bone, and a blood vessel extracted from the voxel data shown in FIG. 2;

FIG. 4 is a plan view of surface image according to the first embodiment which simulates cutting;

FIG. 5 is a schematic view for explaining distance data according to the first embodiment;

FIG. 7 is a block diagram of a second embodiment of the three-dimensional image processing apparatus according to the present invention;

FIGS. 8A, 8B, and 8C are perspective views showing an operation procedure of the second embodiment;

DETAILED DESCRIPTION OF THE PREFERRED EMBODIMENTS

Figure 6:
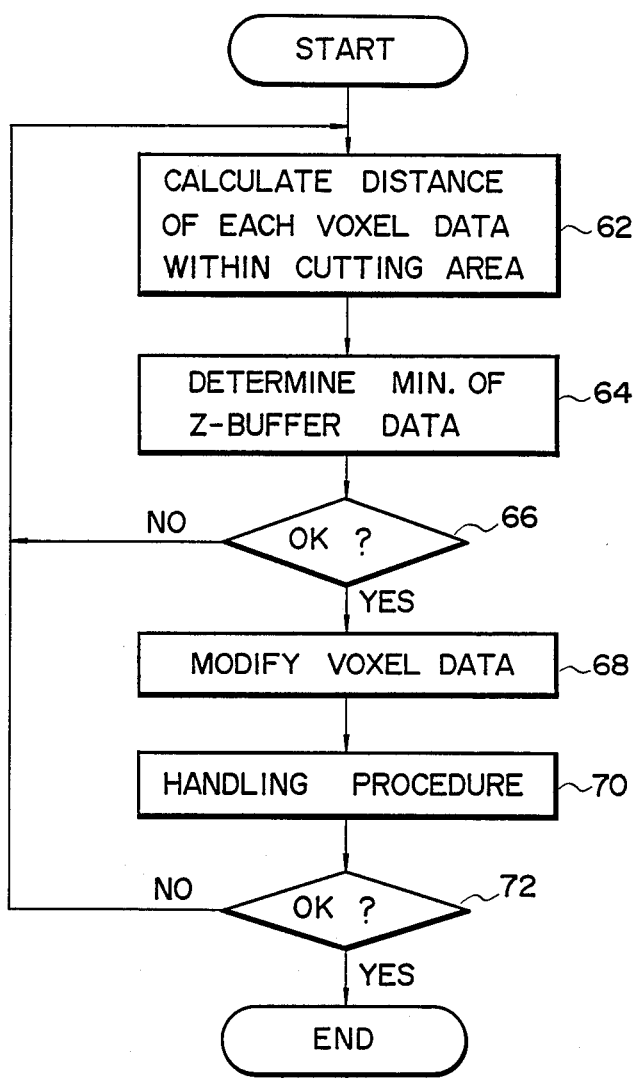
FIG. 6 is a flow chart of an operation of the first embodiment.

Embodiments of a three-dimensional image processing apparatus according to the present invention will be described below with reference to the accompanying drawings.

FIG. 1 is a block diagram of a first embodiment. A plurality of tomographic image data (multilevel data having a density gradation) acquired by an X-ray apparatus, an MRI (magnetic resonance imaging) apparatus, or the like is stored in three-dimensional memory 10 as voxel data. If resolution in a direction perpendicular to a slice (tomographic section) is poor in the actual tomographic image data, data between slices is obtained by interporation.

FIG. 2 shows such voxel data. In FIG. 2, voxel data concerns a head portion of a human body.

Read address generator 12 is connected to memory 10.

The output terminal of memory 10 is connected to level detector 14. Detector 14 has a plurality of ranges of CT value and binarizes an output from memory 10 in accordance with each range. This is, when the output from memory 10 has a value within a predetermined range, detector 14 supplies a signal of level "1". Otherwise, detector 14 supplies a signal of level "0". In this case, if ranges including CT values of an epidermis, a bone, and a blood vessel are used as predetermined ranges, binary voxel data of the epidermis, the bone, and the blood vessel can be written in three-dimensional memories 16a, 16b, and 16c as shown in FIGS. 3A, 3B, and 3C, respectively. Generator 12 is also connected to memories 16a, 16b, and 16c.

Outputs from memories 16a, 16b, and 16c are supplied to distance detector 18. Detector 18 detects a distance from a projection plane to a three-dimensional object assuming that the three-dimensional object is projected from a given view point to the projection plane. For this purpose, parameters for defining the projection plane and a view direction (direction perpendicular to the projection plane) are input to detector 18. As parameters defining the projection plane, coordinates of two points on the diagonal line of the projection plane a distance between a center of the voxel and the projection plane, and the matrix size of the projection plane are input. As parameter defining the view direction, coordinates of two points on the line along the view direction are input.

FIG. 5 shows this distance. Assuming that a distance between projection plane 50 and predetermined plane 52 parallel to projection plane 50 is D, distance d from projection plane 50 to three-dimensional object 54 is detected. If distance D is known, distance d can be obtained by detecting longest distance D-d from plane 52 to object 54.

Detector 18 sequentially updates addresses of pixels which are two-dimensionally arranged in a matrix manner to constitute the projection plane from the one on the projection plane (pixel) along a direction perpendicular thereto and detects an updating count of the addresses until voxel data of "1" appears as a distance between the projection plane and the three-dimensional object. However, a detection method of the distance is not limited to this, but any other similar methods may be adopted.

The distance from voxel data of each tissue to the projection plane is obtained to form a surface image of each tissue as will be described later.

Distances from the projection plane to the three-dimensional images respectively of the epidermis, the bone, and the blood vessel are input to Z-buffers 20a, 20b, and 20c. Outputs from Z-buffers 20a, 20b, and 20c are supplied to minimum detector 22.

Detector 22 detects a minimum value of the outputs from Z-buffers 20a, 20b, and 20c, i.e. a distance between the projection plane and the three-dimensional object which is closest to the projection plane of the three-dimensional objects of the epidermis, the bone, and the blood vessel. Then, detector 22 writes a detected value (minimum distance) in an address corresponding to a pixel of two-dimensional memory 24 having an address matrix corresponding to a pixel matrix of the projection plane. A write address for memory 24 is generated by write address generator 26.

As a result, a distance from the projection plane to the surface of the three-dimensional object which is closest to the projection plane of the three-dimensional objects of the respective tissues is written in memory 24.

In this case, if the projection plane is located outside a memory space of voxel data, data of a distance to the epidermis is selected as a minimum distance. When the projection plane is moved closer to the memory space of the voxel data and finally enters the memory space, the distance data of the epidermis is excluded, and then distance data of the bone is excluded. Finally, a distance of the blood vessel image is selected as a minimum value.

For this reason, when part of the projection plane is sequentially moved closer to the memory space of the voxel data along a view direction (direction perpendicular to the projection plane), an interior of the head portion can be gradually seen as in an actual operation. This part of the projection plane corresponds to a cutting area and a moving distance corresponds to a cutting depth in an operation. For this reason, parameters representing the cutting area and the cutting depth (i.e., coordinates representing the cutting area and a length representing the cutting depth) are input to detector 22. Therefore, as for the pixels in the cutting area, the distance data is corrected assuming that the projection plane is shifted to the memory space of the voxel data by an amount of the cutting depth. That is, as for the pixels in the cutting area, after the cutting depth is subtracted from the outputs from Z-buffers 20a, 20b, and 20c, the minimum distance is detected. If a distance is obtained as a negative value upon subtraction, this distance is excluded from minimum distance detection assuming that a tissue represented by the distance is already removed by cutting.

Distance data output from memory 24 is supplied to surface image generator 28. Generator 28 performs shading of two-dimensional image data including the distance data to generate a surface image and displays the surface image which is partially cut as shown in FIG. 4 on monitor 30.

Write address generator 12, level detector 14, and memories 16a, 16b, and 16c constitute an extraction portion of images of the epidermis, the bone, and the blood vessel. Write address generator 26, distance detector 18, Z-buffers 20a, 20b, and 20c, and minimum detector 22 constitute a distance data formation portion.

When it is desired that the voxel data is modified by changing the view direction, the view direction parameter is changed and the same processing is repeated. In this case, the voxel data concerning the epidermis and the blood vessel which are excluded by cutting must be changed from "1" to "0" in memories 16a and 16b, respectively.

In the first embodiment, in order to select the three-dimensional image data which is closest to the projection plane, i.e., which is to be displayed as the surface image, a minimum value of distance d from the projection plane to a position at which data is "1" is obtained. However, when D-d shown in FIG. 5 is used as distance data I (z), a detector for detecting a maximum value of data I (z) may be provided instead of the minimum detector.

As described above, according to the first embodiment of the present invention, surface images of a variety of tissues (e.g., a bone, a blood vessel, and a tumor) can be displayed in a single three-dimensional space so that a positional relationship between the objects obtained when viewed from a predetermined projection plane is recognized well. In addition, since the projection plane can be partially moved closer to a tissue, tissues such as an epidermis, a bone, and a blood vessel can be sequentially displayed in the order named, thereby enabling simulation of an operation.

A flow chart of an operation of the first embodiment is shown in FIG. 6. In FIG. 6, step 62 is a step for obtaining distances from the projection plane to the respective voxel data in the cutting area; step 64 is a step for obtaining a minimum value of the distances to the respective three-dimensional images in the cutting area; and step 66 is a determination step for interactively performing this simulation. In this case, until a desired simulation image is obtained, steps 62 and 64 are repeated by changing a cutting area and a cutting depth. Steps 62 and 64 relate to a provisional cutting operation.

If YES in step 66, data concerning the cutting area and the cutting depth of data stored in three-dimensional memories 16a, 16b, and 16c are set to be 0 in real cutting step 68. Therefore, voxel data of each tissue can be removed in accordance with cutting. Thereafter, in step 70, the data in memories 16a, 16b, and 16c are subjected to handling processing (rotation and parallel movement) to change the view direction.

A second embodiment of the present invention will be described below.

As shown in FIG. 7, an output from three-dimensional memory 74 is supplied to section extraction circuit 78 through interpolation circuit 76. As in the first embodiment, voxel data is written in memory 74. Interpolation circuit 76 interpolates data between slices. Section extraction circuit 78 extracts sectional data of axial, coronal, and sagittal sections from the voxel data.

A relationship between the axial, coronal, and sagittal sections is shown in FIG. 8A.

Parameters for specifying positions of the respective sections are input by an ROI (region of interest) input such as a tracker ball.

The sectional data of the axial, coronal, and sagittal sections are affine-transformed by affine transformer 80 on the basis of a view direction set by the parameters and then combined and displayed on monitor 82. This image is called "volume multi-plane reconstruction (MPR) image". Note that since the view direction can be changed, the volume MPR image can be obtained from any angle.

In the second embodiment, cutting can be simulated. As shown in FIG. 8B, cutting portion 84 is designated by the ROI input. Then, section extraction circuit 78 extracts sectional images of sagittal sections S1 and S2 and axial sections A1 and A2 including an edge of cutting portion 84 and coronal section C including a bottom (in a depth direction) of portion 84. These extracted sections are affine-transformed and combined, thereby displaying a volume MPR three-dimensional image as shown in FIG. 8C.

Figure 9:
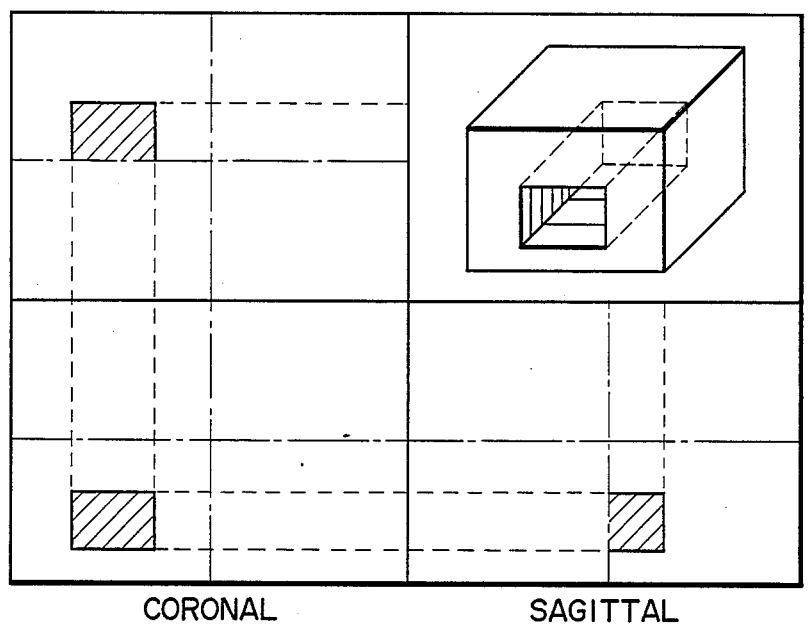
FIG. 9 is a plan view of multi-frame display as an example according to the second embodiment.

However, according to the above volume MPR image, although a positional relationship between the respective sections can be recognized, an actual size cannot be known. Therefore, it is effective to display the volume MPR image together with the axial, coronal, and sagittal sectional images in a multi-frame manner. FIG. 9 shows such multi-frame display. In FIG. 9, the upper right image is the volume MPR image, and the upper left, lower left, and lower right images are the axial, coronal, and sagittal sectional images, respectively. With these images, each section can be observed in detail, and a positional relationship between the respective sections can be easily recognized. Note that a cutting portion is also displayed in each sectional image. In this case, as for a portion which is not seen, only lines indicating a section are displayed.

Figure 10:
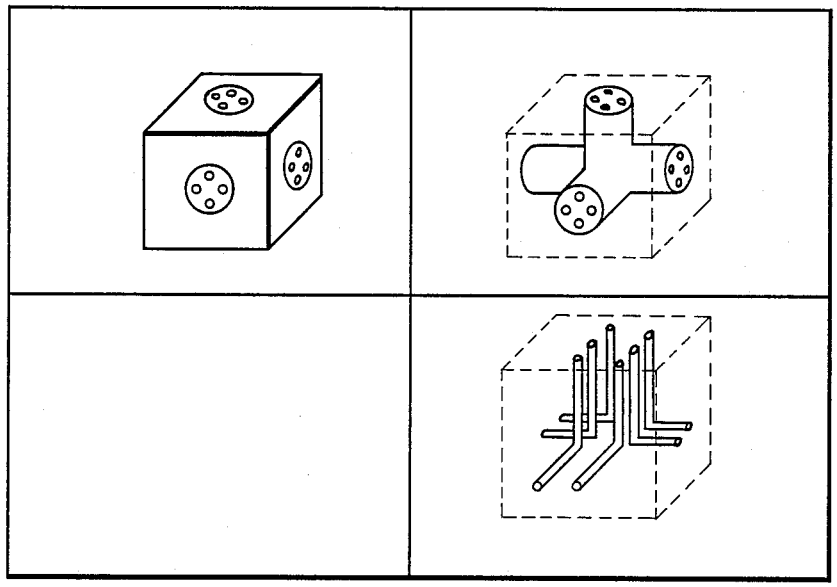
FIG. 10 is a plan view of multi-frame display combined of an image according to the first embodiment and that according to the second embodiment.

When the surface image according to the first embodiment and the volume MPR image according to the second embodiment are combined in a multi-frame manner as shown in FIG. 10, three-dimensional images viewed from the same view point and having the same size can be observed at the same time. Therefore, a positional relationship between the bones, blood vessels, and veins can be easily recognized. In FIG. 10, the upper left image is the volume MPR image, the upper right image is a surface image of the epidermis in a three-dimensional space of the volume MPR image, and the lower right image is a surface image of the blood vessels in the three-dimensional space. In FIG. 10, although simulation display of the cutting portion is omitted, it can be performed. Display shown in FIG. 10 can be easily realized by combining the circuits of FIGS. 1 and 7.

The surface image may be displayed together with the conventional oblique (section) image in a multi-frame manner. In this case, the section extraction circuit in FIG. 7 need only extract an oblique surface, and the oblique image is displayed instead of volume MPR image in FIG. 10.

Figure 11:
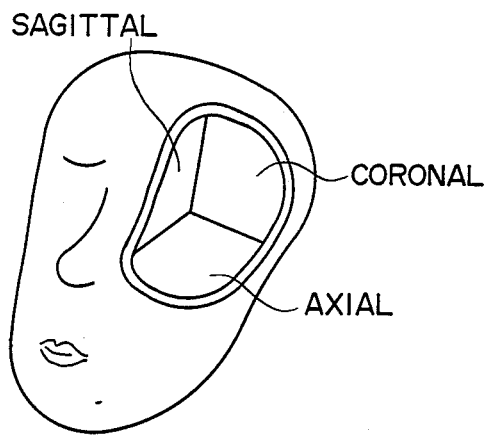
FIG. 11 is a perspective view of a combination display of a surface image and a volume multi-plane reconstruction image.

In the surface image display according to the first embodiment of the present invention, a coronal section including a bottom surface in a cutting depth direction may be displayed instead of the surface image within the cutting area, and sagittal and axial sections both contacting the coronal section may be combined in a view direction of the surface image, thereby combining and displaying the surface image and the volume MPR image as shown in FIG. 11. As a result, cutting can be simulated more easily.

Figure 12:
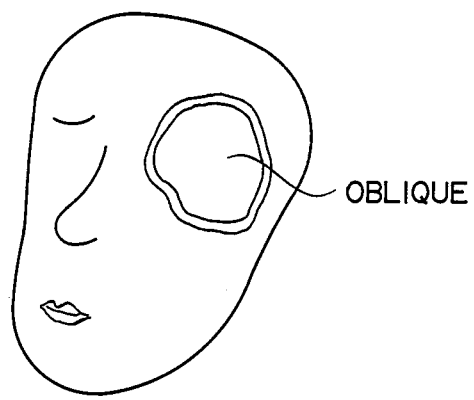
FIG. 12 is a perspective view of a combination display of a surface image and an oblique image.

In addition, an oblique sectional image in the cutting area may be displayed instead of the volume MPR image in FIG. 11, thereby combining and displaying the surface and oblique images as shown in FIG. 12.

As has been described above, according to the present invention, since a cutting portion can be three-dimensionally displayed in accordance with a cutting procedure, there is provided a three-dimensional image processing apparatus which can perform simulation upon planning an operation.

What is claimed is:

1. A three-dimensional image processing apparatus comprising:
    memory means for storing first voxel data representing an object in a three-dimensional space;
    extracting means for extracting a plurality of second voxel data representing a plurality of tissues from the first voxel data stored in said memory means;
    first designating means for designating a predetermined plane in the three-dimensional space as a projection plane;
    distance detecting means for detecting distances between pixels in the projection plane and voxels in each of said plurality of second voxel data;
    second designating means for designating a predetermined range in the projection plane as a cutting area;
    third designating means for designating a cutting depth in the cutting area;
    distance correcting means for correcting the distances detected by said distance detecting means in accordance with the cutting depth;
    minimum distance detecting means for detecting a minimum value of the distances between the pixels in the projection plane and the voxels in each of said plurality of second voxel data; and
    surface image generating means for generating a surface image in accordance with the minimum value of the distances of the pixels in the projection plane obtained by said minimum distance detecting means.

2. An apparatus according to claim 1, further comprising simulating means for simulating cutting of the object in the three-dimensional space by changing a position of the projection plane, a size of the cutting area, and the cutting depth.

3. An apparatus according to claim 1, in which said distance correcting means corrects the distances by subtracting the cutting depth from the distances detected by said distance detecting means.

4. An apparatus according to claim 1, in which said extracting means compares the first voxel data with specific threshold values of a plurality of tissues and forms a plurality of binary second voxel data.

5. A three-dimensional image processing apparatus comprising:
   memory means for storing voxel data representing a three-dimensional object;
   extracting means for extracting sectional data representing axial, coronal, and sagittal images from the voxel data stored in said memory means; and
   means for affine-transforming the sectional data extracted by said extracting means and three-dimensionally combining the affine-transformed sectional data based on a view direction, thereby generating a volume multi-plane reconstruction image.

6. An apparatus according to claim 5, in which said extracting means comprises:
   designating means for designating a cutting area and a cutting depth; and
   means for extracting a section including an edge of the cutting area and a section located at the cutting depth.

7. An apparatus according to claim 5, further comprising display means for displaying the volume multi-plane reconstruction image and the axial, coronal, and sagit-tal sectional images in a multi-frame manner.

8. A three-dimensional image processing apparatus comprising:
   memory means for storing first voxel data representing an object in a three-dimensional space;
   first extracting means for extracting a plurality of second voxel data representing three-dimensional objects of a plurality of tissues from the first voxel data stored in said memory means;
   designating means for designating a predetermined plane in the three-dimensional space as a projection plane;
   distance detecting means for detecting distances between pixels in the projection plane and voxels in each of said plurality of second voxel data;
   surface image generating means for generating surface images of the second voxel data in accordance with the distances of the pixels obtained by said distance detecting means;
   second extracting means for extracting sectional data representing axial, coronal, sagittal images from the first voxel data stored in said memory means;
   volume multi-plane reconstruction image generating means for affine-transforming the sectional data extracted by said second extracting means and three-dimensionally combining the affine-transformed sectional data based on a view direction, thereby generating a volume multi-plane reconstruction image; and
   display means for displaying the surface images of the second voxel data and the volume multi-plane reconstruction image in a multi-frame manner.

* * * * *